United States Patent [19]
Stallaert et al.

[11] Patent Number: 6,035,287
[45] Date of Patent: Mar. 7, 2000

[54] METHOD AND APPARATUS FOR BUNDLED ASSET TRADING

[75] Inventors: Jan Stallaert; Andrew Bernard Whinston, both of Austin, Tex.; Glenn William Graves, Malibu, Calif.

[73] Assignee: Omega Consulting, Inc., Austin, Tex.

[21] Appl. No.: 08/992,647

[22] Filed: Dec. 17, 1997

[51] Int. Cl.[7] .................................................. G06F 17/60
[52] U.S. Cl. .......................................................... 705/37
[58] Field of Search ................................................ 705/37

[56] References Cited

U.S. PATENT DOCUMENTS

| | | | |
|---|---|---|---|
| 4,412,287 | 10/1983 | Braddock, III | 364/408 |
| 4,674,044 | 6/1987 | Kalmus | 364/408 |
| 5,077,665 | 12/1991 | Silverman et al. | 364/408 |
| 5,101,353 | 3/1992 | Lupien et al. | 364/408 |
| 5,136,501 | 8/1992 | Silverman et al. | 364/408 |
| 5,689,652 | 11/1997 | Lupien et al. | |
| 5,845,266 | 12/1998 | Lupien et al. | 705/37 |

OTHER PUBLICATIONS

Fan, et al., Creating Electronic Markets; Dr. Dobb's Journal; Nov. 1998; 5 pages.

Kalakota, et al.; Worldwide Real–Time Decision Support Systems for Electronic Commerce Applications; Journal of Organizational Computing and Electronic Commerce 6(1), 11–32 (1996); 22 pages; University y of Texas; Austin, Texas.

R.M. Miller; On Distributing the Intelligence of Economic Process; IFAC Economics and Artificial Intelligence; 1986; 2 pages; Aix–en–Provence, France.

Adams et al., "Commodity Bundling and the Burden of Monoploy," *The Quarterly Journal of Economics* vol. XC, 475–498 (1976).

Brewer et al., "A Binary Conflict Ascending Price (BICAP) Mechanism for the Decentralized Allocation of the Right to Use Railroad Tracks," Social Science Working Paper 887, California Institute of Technology, Division of the Humanities and Social Sciences, Pasadena, California (Feb. 1995).

Goodwin, Richard M., "Iteration, Automatic Computers, and Economic Dynamics," *Metroeconomica* vol. III, pp. 1–7, (Apr. 1951).

Levin, Jonathan, "An Optimal Auction for Complements," *Games and Economic Behavior* vol. 18, 176–192 (1997).

McAfee et al., "Multiproduct Monopoly, Commodity Bundling, and Correlation of Values," *The Quarterly Journal of Economics* 371–383 (May 1989).

Gjerstad et al., "Price Formation in Double Auctions," pp. 1–32 (Apr. 7, 1997).

McAfee et al., "Analyzing the Airwaves Auction," *Journal of Economic Perspectives* vol. 10, No. 1, 159–175 (Winter 1996).

(List continued on next page.)

*Primary Examiner*—Eric W. Stamber
*Assistant Examiner*—Susanna Meinecke-Diaz
*Attorney, Agent, or Firm*—Barry S. Newberger; Winstead Sechrest & Minick P.C.

[57] ABSTRACT

The present invention allows market participants to exchange bundles of assets, including assets in different asset classes. A market participant may value the bundle as an entity, alleviating the need to attempt to attain a value objective in the aggregate by valuing and trading assets individually. A bundle of assets to be traded is entered, wherein proportions of each asset to be traded in units of a specified bundle size are provided by the market participant. Assets to be acquired by one market participant are matched against the same asset which other market participants are seeking to dispose. An exchange of bundled assets among market participants, in units of the bundles themselves is effected when the exchange satisfies a predetermined set of criteria.

52 Claims, 6 Drawing Sheets

OTHER PUBLICATIONS

Weber, Bruce W., "Transparency and Bypass in Electronic Financial Markets," *Proceedings of the Twenty–Seventh Annual Hawaii International Conference on System Sciences,* pp. 865–874 (1994).

Domowitz et al., "Auctions as algorithms," *Journal of Economic Dynamics and Control* vol. 18, pp. 29–60 (1994).

Radosevich, Lynda, "Wired," *Webmaster,* pp. 26–31 (Feb. 1997).

Branco, Fernando, "Designing Markets: on the Use of Combinational Bids in Multi–object Auctions," pp. 1–25 (May 1997).

McAfee et al., "Electronic Markets" in *Readings in Electronic Commerce,* pp. 293–309 (Addison Wesley Longman, Inc. 1997).

Hill et al., "Equity Trading, Program Trading, Portfolio Insurance, Computer Trading and All That," *Financial Analysts Journal,* pp. 29–35 (Jul.–Aug. 1988).

Rubinstein, Mark, "Market Basket Alternatives," *Financial Analysts Journal,* pp. 20–29 (Sep.–Oct. 1989).

McCabe et al., "Designing 'Smart' Computer–Assisted Markets: An Experimental Auction for Gas Networks," *Journal of Political Economy* vol. 5, pp. 259–283 (1989).

Rassenti et al., "A combinatorial auction mechanism for airport time slot allocation," *The Bell Journal of Economics,* vol. 13, pp. 402–417 (1982).

Domowitz, Ian, "The Mechanics of Automated Trade Execution Systems," *Journal of Financial Intermediation* vol. 1, pp. 167–194 (1990).

Rothkopf et al., "Computationally Manageable Cominatorial Auctions," pp. 1–26, Rutgers University (Dec. 1995).

Bikhchandani et al., "Competitive Equilibrium in an Exchange Economy with Indivisibilities," *Journal of Economic Theory* vol. 74, pp. 385–413 (1997).

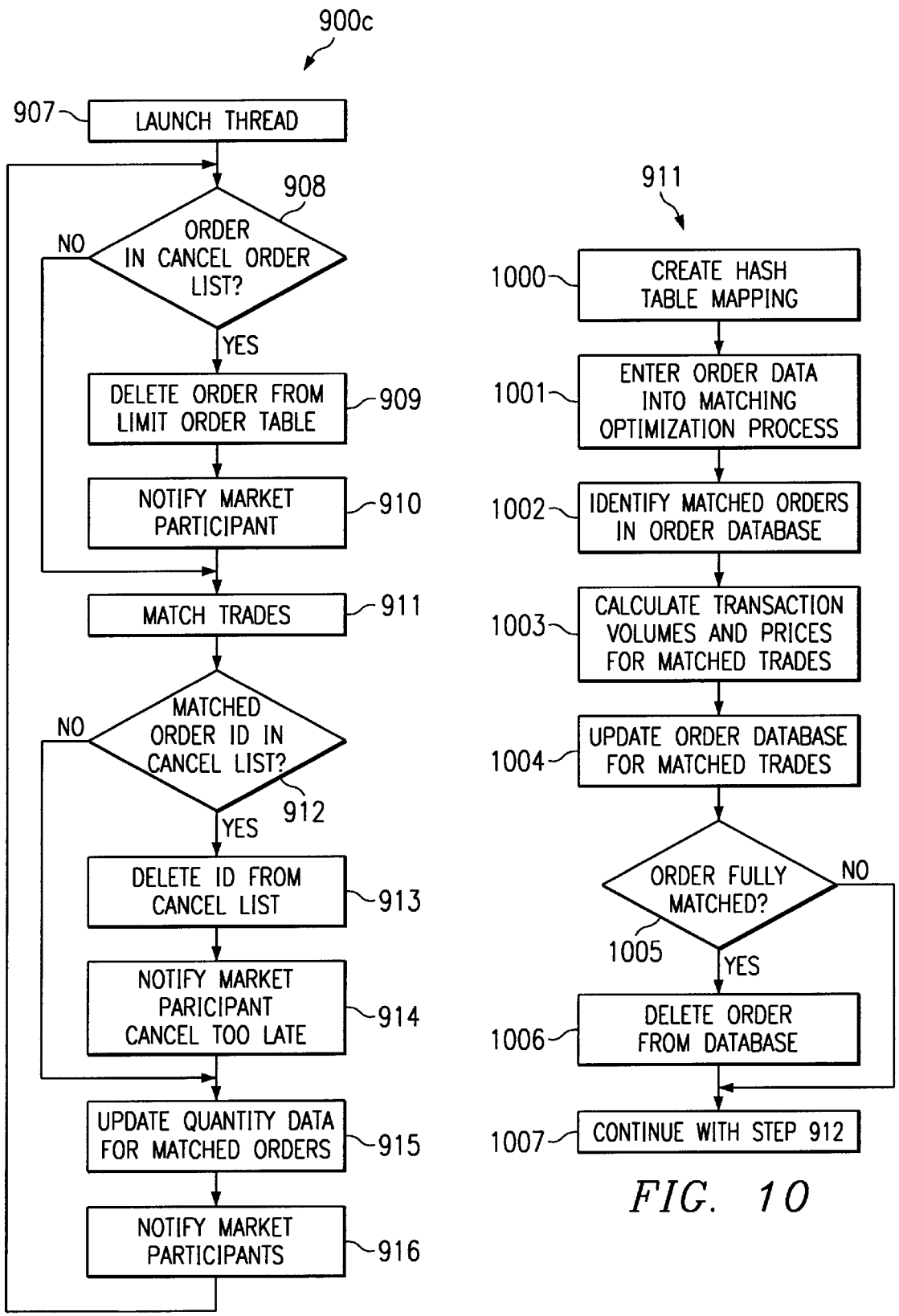

METHOD AND APPARATUS FOR BUNDLED ASSET TRADING

TECHNICAL FIELD

The present invention relates to a method and apparatus for trading assets in bundles.

BACKGROUND INFORMATION

Data processing systems for the exchange of financial instruments and securities are old in the art. For example, the first subsystem to be employed in commercial practice was Instinet, which began operations in 1969. The Instinet system was a subject of U.S. Pat. No. 3,573,547 issued on Apr. 6, 1971. Instinet permits subscribers to engage in direct trading of securities among themselves on an anonymous basis. In effect, Instinet replaces the telephone and voice communications with communications conducted via the data processing system, with confirmations of trades being automatically transmitted to each party and to the appropriate clearing entity for settlement.

Other electronic data processing systems are exchange based order routing processors. For example, on the New York Stock Exchange (NYSE) is the Designated Order Turnaround System (or DOT) through which member firms transmit market and limit orders directly to the post where a security is traded, thereby dispensing with the messenger services of a floor broker. Limit orders are electronically filed while market orders are exposed to the (market) in front of the specialist's post, and executed either by a floor broker or the specialist. Automated data processing systems for small order execution exist in the dealer markets as well.

Regardless of the implementation, all such data processing systems for asset trading operate on an asset-by-asset basis. A trader (or a broker acting as his agent) may enter an order to acquire or dispose of a particular asset, or a portfolio of assets. In either case, individual transactions are consummated with respect to each of the assets individually. However, in many situations, a market participant does not necessarily derive value for a single asset, but for a basket of assets. In such a circumstance, the acquisition or disposition of assets on a asset-by-asset basis in order to obtain the basket of assets in the right proportion, and at the right price, may prove to be a complicated and time consuming task.

The market participant's problem is further exacerbated when the assets are within different asset classes. Here and throughout, the term asset is used in its broadest sense. An asset may be anything of value, and in a particular context, may be a commodity or other good, securities, or services, as well as money. To illustrate the problem, consider the supply chain problem as applied, for example, to cross docking operations. A typical instance of cross docking arises in the grocery trade.

In the grocery trade, goods are received from a multiplicity of producers and manufacturers for ultimate distribution in retail markets which are widely disbursed. A good flows to the grocer as a unitary item in bulk from the producer or manufacturer. These must then be broken into smaller unit sizes and distributed to the retail outlets, along with other goods from other manufacturers. Thus, the flow of goods from the producers must be warehoused and then redistributed. The facilities for warehousing and introduction of goods into a transportation stream for redistribution are the so-called cross docking facilities.

It is common practice to outsource the cross docking facilities and the transportation for redistribution. Thus, a grocer must acquire both the cross docking capacity and the transportation services to effect its objective, and these are acquired from different sources, that is, in a fragmented market. Moreover, the value of one of the two requirements is greatly diminished without the acquisition of the other.

The value to the grocer is in the aggregate, or basket, represented by the cross docking capacity and transportation service. In effect the price of one could be traded off against the other. If a ready means of cheap transportation is available, then the acquirer could afford to pay more for the cross docking capacity, or use a cross docking facility with wasted capacity, or vice versa. However, the fragmentation of the market for these services makes it difficult to implement such tradeoffs. An acquirer of the services would be better able to satisfy his requirements if he could obtain them as a bundle. Then he would only need to set the bundle price as his objective price. The bundle trading market would allocate price between the resources exchanged. Such a bundled trading mechanism also would squeeze out inefficiencies associated with the fragmented market for these resources.

A similar situation exists in the securities markets. A trader acquiring or disposing of a portfolio of equities may wish to hedge the acquisition or disposition by offsetting transactions in futures, options, or perhaps foreign currencies. The transactions implementing these acquisitions and dispositions take place in a fragmented market. The different assets are traded in different markets and the transactions may be displaced one from the other both in place and in time. Trading the assets individually in the fragmented market may lead to an overall loss with respect to the basket of assets due to market volatility. Thus, there is a need in the art for a method and apparatus for implementing a mechanism by which a market basket, or "bundle," of assets may be exchanged among market participants.

SUMMARY OF THE INVENTION

The previously mentioned needs are addressed by the present invention in which market participants will be able to exchange among themselves, a combination of assets as a bundle. An electronic data processing system executing a trade matching mechanism provides the function of a market intermediary, recombining assets from different market participants such that the requirements of participants seeking to acquire a particular asset are satisfied by participants seeking to dispose of the same asset.

Market participants enter their asset bundles into the data processing system. The data processing system operates continuously and market participants can submit new trade orders, or bundles, or cancel open orders, at any time. The data processing system operates continuously to find matches in real-time.

Each bundle contains a plurality of assets to be exchanged. Bundles are specified in terms of a bundle size, and a set of values representing the proportions of each of the assets to be exchanged, in terms of the bundle size. Each bundle may contain a subset of assets which the market participant seeks to acquire, and a second subset of assets of which the market participant seeks to dispose. Acquisition trades may be distinguished from disposition trades using a signature represented by an algebraic sign of each of the proportions of the respective assets within the bundle. For example, assets to be acquired, hereinafter referred to as acquisition assets, may be represented by a proportion having a positive algebraic sign, and assets of which the market participant seeks to dispose, hereinafter referred to as disposition assets, may be represented by a negative algebraic sign.

As bundles are entered, the data processing system matches trades among the plurality of all bundles. The data processing system accomplishes the matching by assigning a set of non-negative numerical values to each bundle of the plurality of bundles entered which are to be incorporated into the match trade. Each of these numerical values represents the proportion by which each participating bundle is represented in the matched trade. That is, the numerical value represents the allocation of any particular participating bundle to the match trade. Then, the proportion of each asset in a particular bundle that is committed to the exchange is represented by the proportion of the asset in the bundle multiplied by the allocation value assigned by the data processing system to that particular bundle.

A trade is matched when the market surplus for each asset to be exchanged is non-negative. The allocation values are chosen by the data processing system so that this matching condition is satisfied. A non-negative market surplus in an asset occurs when the net valuation of the asset among disposing market participants is equal to, or exceeded by, the net valuation placed on the asset by acquiring market participants. The valuations, in turn, are represented by the proportions of each asset in each of the bundles forming the trade.

The data processing system implementing the bundle trading market may be a distributed data processing system.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 schematically illustrates bundled trades according to an embodiment of the present invention;

FIGS. 9A and 9B illustrate flow diagrams of distributed data processing threads according to an embodiment of the present invention;

FIG. 10 illustrates a flow diagram of a method of trade matching in accordance with an embodiment of the present invention;

DETAILED DESCRIPTION

Figure 2:
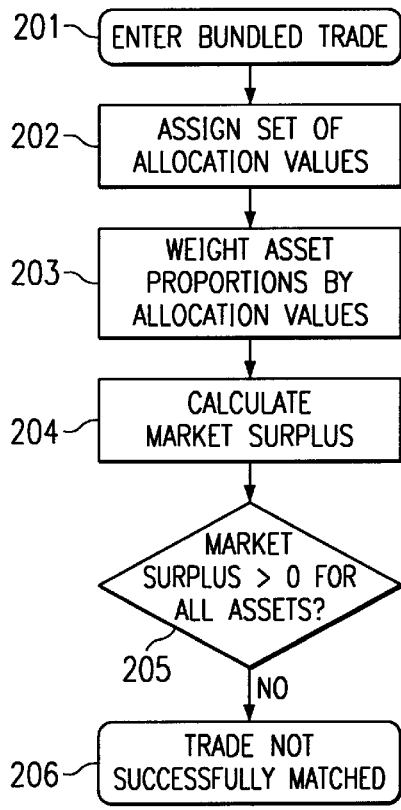
FIG. 2 illustrates a flow diagram of a method of bundled trading in accordance with an embodiment of the present invention.

In the following description, numerous specific details are set forth to provide a thorough understanding of the present invention. However, it will be obvious to those skilled in the art that the present invention may be practiced without such specific details. Refer now to the drawings wherein depicted elements are not necessarily shown to scale and wherein like or similar elements are designated by the same reference numeral through the several views.

An invention that addresses the problem of market fragmentation will now to be described in detail. Refer now to FIG. 1 in which a bundled trade is schematically illustrated. Bundled trade 100 includes four bundles, bundle 100a, bundle 100b, bundle 100c and bundle 100d. Each of bundles 100a–100d may be associated with an individual market participant, but such an association is not essential. A particular market trader might, in principle, offer an unlimited number of different bundles for trade. Entries 101–104 in each of bundles 100a–100d are associated with an asset to be exchanged. Each entry 101, 102, 103, and 104 is associated with an individual asset, assets 1–4, in the embodiment of FIG. 1.

As described hereinabove, assets may incorporate anything of value. Furthermore, it is understood that bundles 100a–100d including only four assets to be exchanged are illustrative only, and that in practice, trade bundles would include a plurality of assets to be exchanged in which the plurality in a representative embodiment of the present invention could include more or less than four assets.

Trade bundles specify the proportion of each asset to be exchanged. The proportions of assets to be traded are represented by the figures within entries 101–104. For example, the asset represented by entry 101, asset 4, in bundle 100a is to be exchanged in 1.5 units of that asset. This value and all the values in entries 101–104 are proportional values. That is, they represent the proportion of each asset to be exchanged in a particular bundle relative to a size of the bundle. The bundle size is represented in entry 105 in each of bundles 100a–100d. Furthermore, the algebraic sign of each of the entry values is a signature that denotes whether the particular asset represented by the entry is an offer to acquire or an offer to dispose. In the embodiment of the invention illustrated in FIG. 1, acquisition offers are represented by entries having a positive algebraic sign and entries representing an offer to dispose have a negative algebraic sign.

It should be noted that an embodiment of the present invention may include assets none of which are money or currency. That is, an embodiment of bundle trading may exchange assets in which all exchanges are barter trades. Therefore, transactions in which in the context of a money exchange would otherwise be referred to as a buy and a sell are herein more generally referred to as an acquisition and a disposition, respectively. Moreover, it should be appreciated that the sign conventions in the embodiment of FIG. 1 signalling acquisition offers and disposition offers may be arbitrarily selected, and the opposite sign convention may be employed in an alternative embodiment of the present invention. This will subsequently be discussed further when the methods of the present invention are described in detail.

The plurality of the portion values in each of bundles 100a–100d effectively represent limit "prices." This is perhaps most easily seen if one of the assets in a bundle represents a currency. For example, if asset 1, entry 101, in bundled trades 100 represents a currency, then the market participant associated with bundle 100d is willing to pay, that is dispose, of one unit of currency in order to acquire a unit of asset represented by entry 102, asset 2. Note that this market participant would also be willing to give up one unit of asset 4, represented by entry 104, as well. Thus, from the perspective of the market participant associated with bundle 100d, the transaction proposed is a combination of a barter transaction and cash transaction. Recall, however, that an embodiment of the present invention may include bundled trades in which no asset represents a currency. That is, an embodiment of the present invention, as discussed hereinabove, may include only barter trades. It is not necessary that at least one asset be a currency, although alternative embodiments of the present invention may include trade bundles having at least one asset which is a currency, and other alternative embodiments might include a plurality of assets representing different currencies. Because an embodiment of the present invention may include trade bundles that are purely barter transactions, it is more precise to regard the plurality of proportion values in each of bundles 100a–100d as relative valuations, rather than a "price."

The data processing system of the present invention receives the bundled trades and selects bundles from among a plurality of bundles for participation in a particular transaction. Refer now to FIG. 2 in which is schematically illustrated a flowchart of a method in accordance with the present invention. A bundled trade, including each of bundles 100a–100d of FIG. 1, is entered into a data processing system (see FIGS. 8 and 12) in step 201. In an embodiment of the data processing system of the present invention, the data processing system may be a distributed data processing system in which market participants enter trade bundles via a network, such as the Internet, through the intermediation of a data processing server. Such an embodiment will be subsequently discussed in greater detail. The data processing system then matches trades from among a plurality of entered trade bundles. The matching process encompasses steps 202–205 in FIG. 2.

In matching the trade, each bundle that is participating in a particular trade is assigned a relative allocation by the data processing system. In step 202, an allocation value is assigned to each of the bundles included in the match trade from among the plurality of entered bundles. For the purposes of further description of the present invention, it is convenient to introduce the indexed variable, $x_j$, to represent the set of allocation values. The index "j" represents the bundle number of bundles in the matched trade. The proportions of each asset in the plurality of assets in each of the bundles are then weighted by the respective allocation value for each of the trade bundles in step 203. It is convenient for the purpose of further discussion to introduce the doubly indexed quantity $z_{ij}$ to represent the plurality of all asset proportions for all of the asset entries in all of the bundles in the bundle trade. As above, "j" represents the bundle number, and "i" represents the asset associated with the asset proportion "$z_{ij}$". The maximum value that i can assume is the number of assets that may be traded in an embodiment of the present invention, and, as hereinabove noted, the maximum value of j is given by the number of bundles included in the match trade. In this notation, the step of weighting the asset proportions by the allocation values in 203 may be represented as:

$$y_{ij} = x_j z_{ij} \forall i \in \{1, \ldots, m\}, j \in \{1, \ldots, n\} \tag{1}$$

The weighted asset proportions have been symbolized by the further notation "$y_{ij}$". The maximum number of assets that may be traded in an embodiment of the present invention is represented by the symbol "m", and the number of trade bundles in the match trade has been denoted by the symbol "n". A market surplus is then calculated for each asset in step 204. The market surplus for each asset will be denoted by the symbol "$\mu_i$". In an embodiment of the present invention, the market surplus for each asset according to step 204 is given by:

$$\mu_i = -\sum_{j=1}^{n} y_{ij} \forall i \in \{1, \ldots, m\} \tag{2}$$

In step 205, if the market surplus for each asset is nonnegative, then the data processing system will redistribute the market surplus in step 207. The step of redistribution, step 207, will subsequently be further described in detail. If the market surplus for each asset is not nonnegative, then the trade match based on the assigned set of allocation values is not a successful match, step 206. The data processing system must then search for another trade match among the plurality of entered trade bundles. In an embodiment of the present invention according to step 205, acquisition offers have a positive algebraic sign and disposition offers have a negative algebraic sign. In an alternative embodiment in which the opposite sign invention is adopted, the condition with respect to the market surplus in a step corresponding to step 205 is that the market surplus be nonpositive.

In the event a trade match is unsuccessful, the data processing system might search among the entered bundle trades using a trial and error process. However, in the data processing system in which the number of entered trade bundles is realistic, such a method is likely to be inefficient and slow. Therefore, a systematic process for finding match trades is to be preferred.

Figure 3:
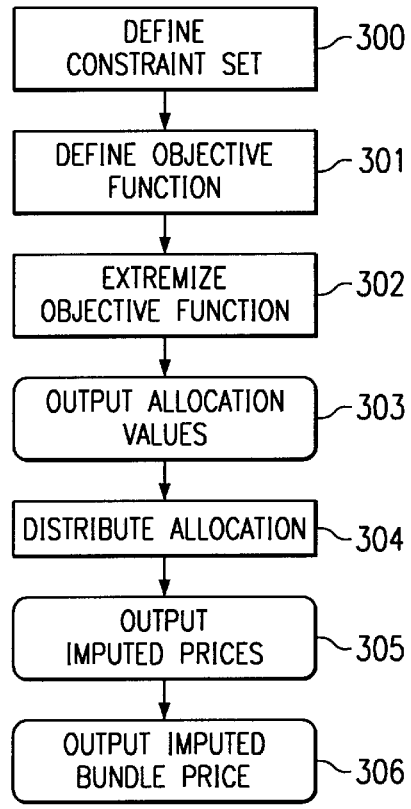
FIG. 3 illustrates a flow diagram of a method of bundled trading in accordance with another embodiment of the present invention.

An embodiment of the present invention implementing a systematic process for matching trades will now be described. Refer now to FIG. 3 in which a flow diagram of a method for matching trades by an optimization process is illustrated. In step 300, a constraint set is defined. In an embodiment of the present invention wherein trade matching is accomplished by an optimization process, a member of the constraint set is the requirement that the market surplus for each asset be non-negative, as described hereinabove. In terms of the symbol $\mu_i$, the first member of the constraint set becomes $\mu_i \geq 0$, in an embodiment in which acquisition assets are represented by positive algebraic sign and disposition assets by negative algebraic sign. In an alternative embodiment having an opposite sign convention, the first member of the constraint set becomes $\mu_i \leq 0$. The second member of the constraint set imposes a constraint on the allocation values which are to be determined as a solution to the optimization process. In an embodiment of the present invention, the second member of the constraint set may be $0 \leq x_j \leq u_j \forall j \in \{1, \ldots, n\}$. The symbol "$u_j$" has been introduced for convenience and denotes the bundle size, discussed previously, of bundle number "j". In an alternative embodiment of the present invention, the second member of the constraint set may be taken to be:

$$\sum_{j=1}^{n} x_j \le 1, \quad \text{and} \quad (3)$$

$$x_j \ge 0 \quad \forall\, j \in \{1, \ldots, n\}.$$

In step 301, an objective function is defined. In an embodiment of the present invention, an objective function may be a so-called convex combination of the market surpluses of each of the assets, that is, the $\mu_i$. It is convenient to introduce the following notation for this convex combination of market surpluses:

$$\sum_{i=1}^{m} c_i \mu_i, \quad c_i \text{ real.} \quad (4)$$

In this expression, the "$c_i$" are preselected constants representing the weighted contribution that asset "i" makes to the objective function. A preselected set of the $c_i$ defines a particular embodiment of a bundled trade data processing system of the present invention. Alternative selections define alternative embodiments. Market participants may elect to enter trades into one or another of competing embodiments depending on the preselected set of $c_i$. This will subsequently be illustrated by way of example.

The set of allocation values, $x_j$, are determined by a step of extremization of the objective function in step 302. The step of extremization, step 302, may be either a maximization or a minimization, depending on the sign convention adopted for the set of asset proportions, $z_{ij}$, previously discussed. Thus, in an embodiment of the present invention wherein a positive value for a $z_{ij}$ is a signature for an acquisition trade and a negative value for a $z_{ij}$ is a signature of a disposition trade, then the step of extremization, step 302, is a maximization step. Conversely, in an embodiment having a sign convention wherein a negative value of $z_{ij}$ is a signature of an acquisition transition and a positive value of a $z_{ij}$ is a signature for a disposition trade, then the step of extremization, step 302, is a minimization step. The extremization step, step 302, determines the set of allocation values, $x_j$, outputted in step 303. Note that because the extremization is subject to the constraint set, and the first member of the constraint set requires that the market surplus for each asset be non-negative, step 205 of FIG. 2 is necessarily satisfied, and a satisfactory trade match is obtained.

After the set of allocation values are outputted, it is necessary to distribute an allocation in step 304, among the matched trade bundles such that the bundle having the smallest bundle size, $u_j$, in proportion to its allocation value, $x_j$, is just exhausted by the matched trade. This can be accomplished by rescaling the allocation values, $x_j$, according to the following detailed in steps 1300–1302 of FIG. 13:

$$v_j = \alpha x_j \forall j \in \{1, \ldots, n\}, \quad (5)$$

where $\alpha = \min\, u_j/x_j$.

The symbol "$v_j$" represents the actual transaction allocation for bundle number "j". Transaction asset allocations are then determined by multiplying the asset proportions $z_{ij}$ by the actual transactions allocations $v_j$, in step 1303.

The optimization process also yields the imputed prices of the assets exchanged in step 305. These are the so-called duals known in the linear programming art. The duals represent the marginal change in the objective function due to a marginal change in the constraints. In an embodiment of the present invention, the constraint set includes the asset proportions. Thus, a subset of the duals represents the marginal change in the asset proportions required to produce a marginal increase in the objective function, Equation (4). That is, those duals represent the "cost," or "price," in unit asset terms, of marginally increasing the aggregated market surplus represented by the convex combination in Equation (4). The asset "prices" are measured in terms of that combination, and are termed the imputed prices of the respective asset. For example, an embodiment of the present invention might include as assets each of the European currencies that will be combined to form the Euro. Preselecting the $c_i$ in Equation (4) to match that combination, would then yield market surplus in Euros, and the imputed price of each asset would be measured in Euros. Imputed prices will subsequently be illustrated by way of example. In step 305, imputed prices for each asset are outputted, and the imputed price for the bundle, calculated by adding up the imputed asset prices weighted by each asset's proportion in the bundle, are outputted in step 306. It then remains to redistribute the market surplus, as in step 207 of FIG. 2, which will now be discussed in detail.

Figure 4:
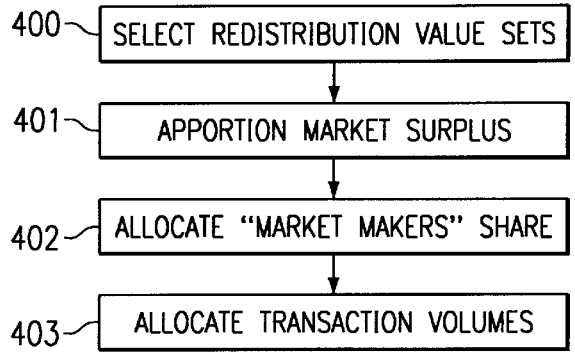
FIG. 4 illustrates a flow diagram of a method of market surplus redistribution in accordance with an embodiment of the present invention.

Refer now to FIG. 4 illustrating a flowchart detailing the market surplus redistribution in step 207 in FIG. 2. In step 400, sets of redistribution values are selected. The set of redistribution values includes a value associated with each asset and each bundle for a total of m×n such values. In addition, the set of redistribution values includes an additional "m" values, one for each asset, that is associated with a market participant in the role of "market maker." In an embodiment of the present invention, the data processing system itself may play the role of the market maker. Thus, the set of redistribution values includes m×(n+1) values in total. Moreover, each redistribution value must lie in the range of values from zero to one, inclusive, and the subset of redistribution values associated with asset number "i" must add up to one when summed over all match trades plus the redistribution value associated with the market maker for asset number "i". It is convenient to introduce the notation "$W_{ij'}$," to denote the set of redistribution values. In terms of this notation, the properties of the redistribution values heretofore recited may be written as follows:

$$W_{ij'}, \quad i \in \{1, \ldots, m\}, \quad j' \in \{0\} \cup \{1, \ldots, n\} \quad (6)$$

$$0 \le W_{ij'} \le 1 \;\; \forall\, i, j' \text{ and}$$

$$\sum_{j'=0}^{n} W_{ij} = 1 \;\; \forall\, i.$$

In step 401, the market surplus is apportioned by forming the m×n values in accordance with: $W_{ij}\mu_i\alpha$, $i \in \{1, \ldots, m\}$, $j \in \{1, \ldots, n\}$. In similar fashion, the market maker's share is allocated in step 402 in accordance with: $W_{i0}\mu_i\alpha$, $i \in \{1, \ldots, m\}$. An embodiment having no redistribution would simply have all of the "$W_{ij}$" equal to zero, and "$W_{i0}$" equal one.

In an embodiment of the present invention, the market maker may retain this allocation as a fee. A special case of such an embodiment is an embodiment in which one or more of the assets to be traded is a currency, and the market maker retains an allocation in that asset in accordance with step 402. That allocation may be interpreted as a commission. Such an embodiment will be subsequently discussed by way of example.

Transaction volumes are allocated among the matched bundled trades in step 403. In this step, the actual amounts of each asset to be exchanged among the market participants are allocated in accordance with:

$$z_{ij}v_j + W_{ij}u_i, i \in \{1, \ldots, m\}, j \in \{1, \ldots, n\} \quad (7)$$

There are two important points with respect to the step of redistribution of the market surplus. From the properties of the asset proportions "$z_{ij}$" and the redistribution values, "$W_{ij}$", as well as the market surpluses "$u_i$", as discussed hereinabove, each market participant is in a better position with respect to each asset in the bundle than it otherwise would have been in the absence of the redistribution. In other words, a market participant in a dispositional transaction with respect to asset number "i" disposes of less of that asset than it otherwise would have in the absence of redistribution, and a market participant in an acquisitional transition receives a greater amount of that asset than he otherwise would have received in the absence of redistribution. The other point is that the preselected values in an embodiment of the present invention for the $W_{ij}$, effectively define the structure of the bundled trading market data processing system for that embodiment. Therefore, an electronic market place that is an embodiment of the present invention having a first preselected set of values $W_{ij}$, may compete with an alternative embodiment of an electronic bundled trading market having a second preselected set of values $W_{ij}$. Market participants may select among competing embodiments in accordance with a redistribution defined by the alternative preselected sets of redistribution values. Before discussing an electronic market place embodied in a distributed data processing system of the present invention, two embodiments of the present invention including the step of redistribution, 207, will be described by way of example with respect to bundled trade 100.

Figure 5:
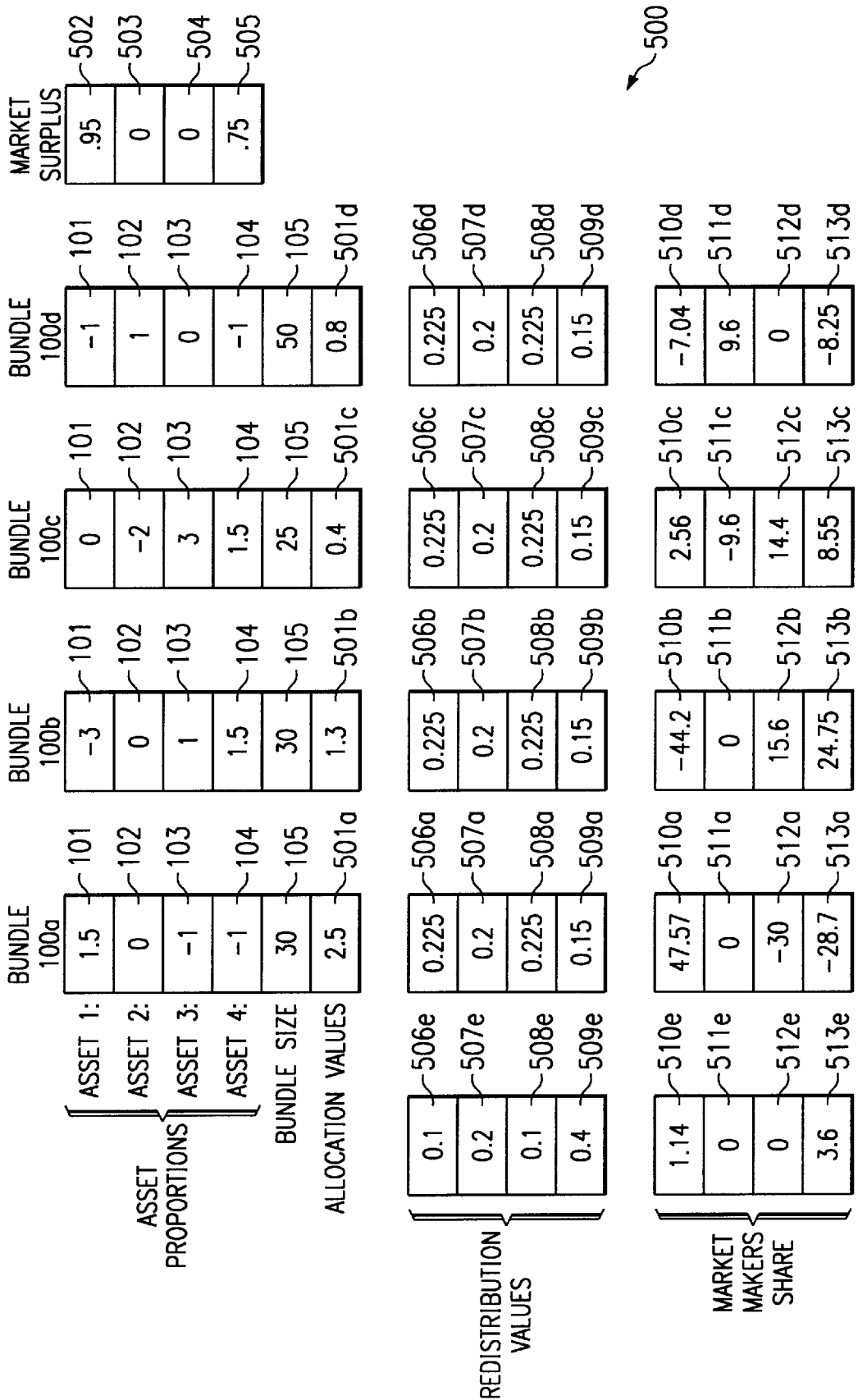
FIG. 5 schematically illustrates a matched transaction in accordance with an embodiment of the present invention.

Refer now to FIG. 5 in which a bundled trade transaction 500 is illustrated in tabular form. In transaction 500, trade bundles 100a–100d have been matched with the allocation values as shown in fields 501a–501d, respectively. The market surplus associated with each of the assets represented in fields 101–104, assets 1–4, are shown in fields 502–505. As the values appearing in fields 502–505 show, the market surplus for each of the assets represented is nonnegative. Thus, transaction 500 represents the successful match with respect to bundles 100a–100d, in accordance with the previous discussion. In fields 506a–506d are shown the redistribution values corresponding to trade bundles 100a–100d for the asset represented in field 101, asset 1. Similarly, fields 507a–507d represent the redistribution values for the second asset in the transaction, the asset represented in the trade bundles by field 102, asset 2. Likewise, fields 508a–508d and fields 509a–509d represent the redistribution value for the third and fourth assets, those represented by fields 103 and 104 in bundles 100a–100d, to be exchanged in transaction 500.

In an embodiment of the bundled trading system of the present invention represented in transaction 500, each trade bundle 100a–100d, participates equally in the redistribution of the market surplus. This is apparent in that with respect to each asset, the redistribution value for each bundle is the same. However, it should be noted that this is not essential, and a different embodiment may have redistribution values such that different market participants, as represented by their bundled trades, receive different redistributions of the market surplus with respect to any or all of the assets in the trade bundle.

In transaction 500, the market maker also participates in the redistribution of the market surplus. Fields 506e–509e contain the redistribution values for each asset in the transaction that determine the market maker's share of the market surplus with respect to each of the assets. Thus, in field 506e, the market maker receives a ten percent share with respect to the market surplus in asset 1, corresponding to field 101. Similarly, as shown by the values in fields 507e–509e, respectively, the market maker receives a twenty percent share of the market surplus with respect to asset 2, a ten percent share of the market surplus with respect to asset 3, and a forty percent share of the market surplus with respect to asset 4, the assets corresponding to fields 102–104. The market maker's share of the market surplus may be viewed as the market maker's "fee" or "commission." However, as discussed hereinabove, transaction 500 may be a barter transaction, in which none of the assets traded represent money.

The actual amount of assets to be exchanged among market participants, a so-called transaction volume, is then found according to Equation (7). The transaction volume for each bundle with respect to the first asset is given in fields 510a–510d. In transaction 500, negative transaction volumes correspond to assets that are being disposed of in a given bundle, and transaction volumes with a positive value are assets being acquired in a given bundle. Fields 511a–511d, 512a–512d, and 513a–513d are the transaction volumes for each bundle for assets 2, 3, and 4, respectively. The market maker's share of each asset appears in field 510e–512e. Several points with respect to the transaction volumes will now be discussed.

Transaction 500 exhausts the supply of asset 3 in bundle 100a. The market participant with respect to bundle 100a has entered a bundle trade in which it seeks to dispose of 30 units of asset of the third asset, represented by field 104. Field 104 in bundle 100a contains the asset proportion value of –1, and the bundle size of bundle 100a is 30 units, as shown in field 105 in bundle 100a. In exchange, the market participant with respect to bundle 100a acquires 47.57 units of the first asset in the bundle, represented by field 101. Note that market participant with respect to bundle 100a sought 45 units of the first asset in the bundle, in accordance with the asset proportion value of 1.5 in field 101 of bundle 100a, and a bundle size of 30 in field 105 of bundle 100a. Thus, by virtue of the redistribution, the market participant with respect to bundle 100a has obtained slightly more of the first asset than it sought. In addition to the 30 units of the third asset, represented by field 104, the market participant with respect to bundle 100a also had to give up 28.7 units, field 510a, of asset 4, represented by field 104 in bundle trade 100a. The market participant with respect to bundle 100a had offered up to 30 units of asset 4, in accordance with an asset proportion value of –1 in field 104, in bundle 100a, and a bundle size of 30 units, field 105 of bundle 100a. Thus, the market participant with respect to bundle 100a has had to "pay" slightly less in asset 4 than his limit order with respect to that asset, by virtue of the redistribution of the market surplus.

The market maker has received 1.14 units of the first asset, represented by field 101, the value in field 510e. The market maker's allocation is in accordance with Equation 6. The market maker receives no allocation with respect to the second and third assets because, as seen in fields 503 and 504, as there was no market surplus with respect to those assets. With respect to asset 4, the market maker received 3.6 units, as seen in field 513e.

Figure 6:
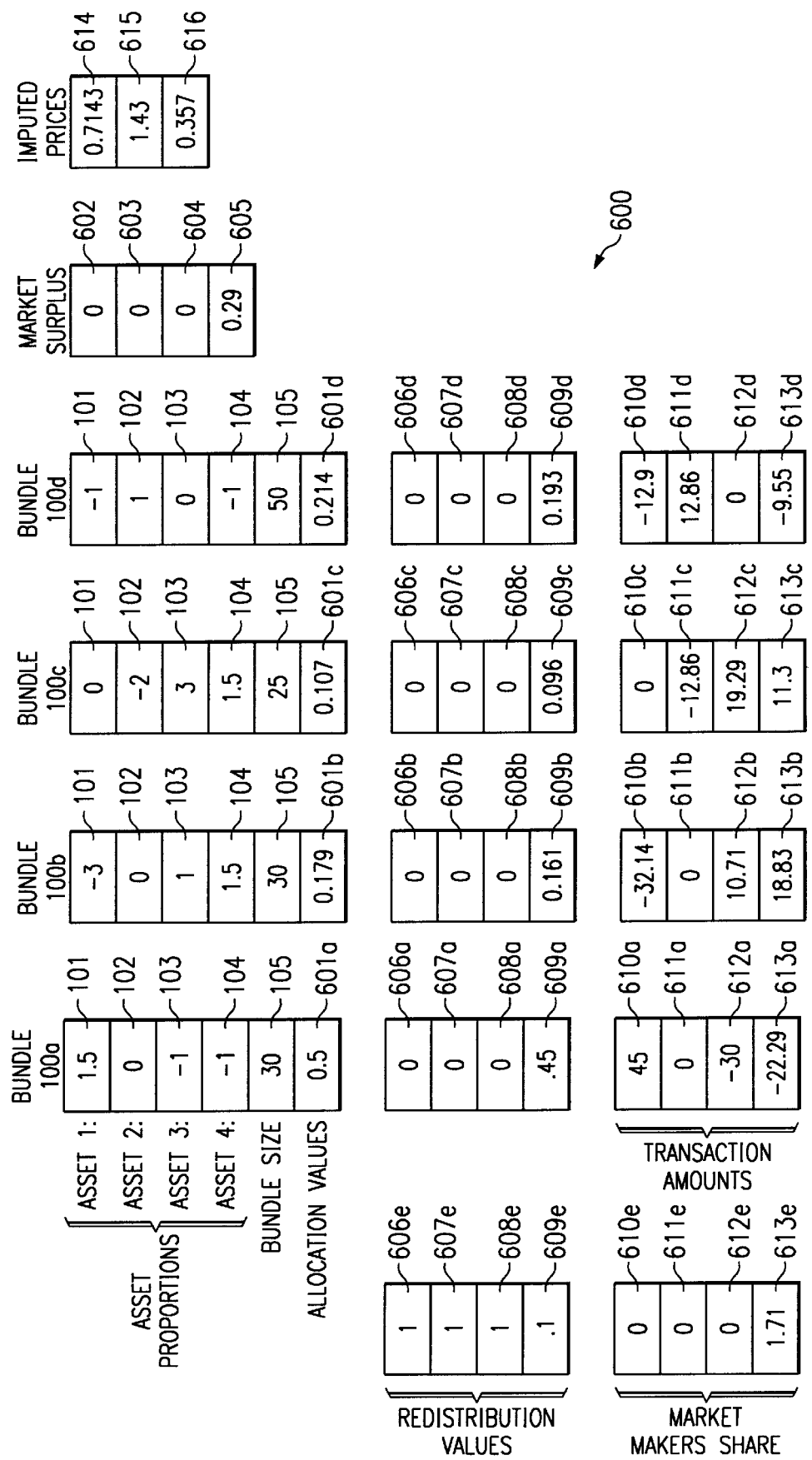
FIG. 6 schematically illustrates a matched transaction in accordance with an alternative embodiment of the present invention.

Refer now to FIG. 6 in which transaction 600 in accordance with another embodiment of the present invention is depicted. In transaction 600, allocation values 601a–601d corresponding to bundles 100a–100d, respectively, are determined in accordance with an embodiment of the present invention using an optimization step, such as step 302 of FIG. 3. In this embodiment, the market surplus with respect to asset 4 has been used as the objective function. That is, in terms of Equation (4), the $c_i$ corresponding to assets 1–3, $c_1$, $c_2$, and $c_3$, are all zero and $c_4$ has a value of 1. The market surplus with respect to three of the four assets included in bundles 100a–100d, corresponding to asset proportions represented in fields 101–103, respectively, are zero, as shown in fields 602–604. For illustrative purposes, asset 4, corresponding to asset proportions included in field 104, may be considered a currency. The market surplus with respect to the currency is shown in field 605 to be 0.29 units of the currency.

In the embodiment of the present invention in transaction 600, the redistribution values associated with each of the noncurrency assets are preselected to be zero with respect to each trade bundle 100a–100d. This is shown in fields 606a–606d, 607a–607d, and 608a–608d. Concomitantly, the redistribution value associated with the noncurrency assets with respect to the market maker is, therefore, 1, as shown in fields 606e, 607e, and 608e. That is, in the embodiment of transaction 600, the market maker plays the role of a market specialist in a traditional exchange with respect to the noncurrency assets. In such an embodiment, the market maker retains his share of the noncurrency assets as an inventory which he may then dispose of as a market participant.

The currency is redistributed according to redistribution values in fields 609a–609e. With respect to the currency, the market maker receives a ten percent allocation of the market surplus, 609e. With respect to the market participants corresponding to bundles 100a–100d, the market surplus in the currency is allocated according to redistribution values preselected in proportion to the respective allocation values for each bundle, 601a–601d. These redistribution values are shown in fields 609a–609d, respectively. This simply says that in the market embodiment of transaction 600, each market participant receives payment, or makes payment, as appropriate, in proportion to the amount of its bundle that is exchanged.

Transaction 600 exhausts bundle 100a with respect to the third asset, in accordance with the asset proportion, field 104, of bundle 100a and a bundle size, field 105, of bundle 100a. This is in accordance with Equation (5), which ensures that at least one bundle included in a matched trade will be exhausted. Market participant with respect to bundle 100a acquires 45 units of the first asset, in accordance with the asset proportion in field 101 of bundle 100a and the bundle size in field 105 of bundle 100a. However, the market participant also has to pay 22.29 units of currency, field 613a, in order to secure the 45 units of the first asset in exchange for its 30 units of the third asset. Nevertheless, due to the redistribution of the market surplus, the market trader with respect to bundle 100a pays less than his limit price of 30 units corresponding to the asset proportion value of −1 for the currency asset, field 104 in bundle 100a, and the bundle size of 30 units in field 105 of bundle 100a.

The assets acquired in bundle 100a are supplied by dispositions in the remaining bundles, bundles 100b–100d. (Of course, bundles with zero units of assets do not participate in the exchange of the corresponding asset, e.g. fields 610c, 611a, 611b, and 612d). Thus, the 45 units of the first asset in bundle 100a, field 610a, are supplied by a disposition of 32.14 units in bundle 100b, field 610b, and a disposition of 12.9 units from bundle 100d, field 610d.

Likewise, the 30 units of asset 3 disposed of by the market participant in bundle 100a are acquired as 10.71 units in bundle 100b, field 612b, and 19.29 units in bundle 100c, field 612c. Similarly for asset 2 in bundles 100c and 100d (fields 611c and 611d). This is a consequence of there being no market surplus with any asset other than the currency, and therefore, there is nothing for the market maker to inventory (zero entries in fields 610c and 612e).

In transaction 600, the optimization step, for example step 302 in FIG. 3, yields imputed prices for assets 1, 2, and 3, as discussed hereinabove. These imputed prices are displayed in fields 614, 615, and 616, respectively. Because the optimization step in transaction 600 maximizes the market surplus in asset 4, which for illustration has been interpreted to be a currency, the imputed prices in fields 614–616 are measured in units of that market surplus, namely, currency units, as discussed hereinabove. In other words, the imputed price of a unit of asset 1 is 0.7143 units of the currency representing asset 4, as shown in field 614. Similarly, the imputed price of asset 2 is 1.43 currency units, field 615 and of asset 3, 0.357 units of currency, field 616.

Consider now bundle 100a in which 45 units of asset 1, field 610a, were exchanged for 30 units of asset 3, field 612a, and 22.29 units of currency, field 613a. Multiplying the imputed price of asset 1 by 45 units and subtracting 30 times the imputed price of asset 3 yields a net price that the market participant with respect to bundle 100a must pay of 21.42 currency units. However, this price does not include the market participant's share of the market maker's commission. The market participant corresponding to bundle 100a enjoys share of the redistribution is proportionately larger, at 45 percent, field 609a, than the redistribution received by the market participants. Thus, the market participant with respect to bundle 100a is responsible for a larger fraction of the market maker's commission. The market participant with respect to bundle 100a is, in fact, responsible for 50 percent of the market maker's commission because its 45 percent redistribution represents 50 percent of the aggregate redistribution to all the market participants. That is, the 45 percent in field 609a represents 50 percent of the redistribution net of the market maker's share. As previously described, the market maker's share is 1.71 units of currency, 613e. Thus, the market participant with respect to bundle 100a is responsible for 50 percent of that, or 0.86 units of currency. Adding this to the net price it must pay with respect to the assets, yields the 22.29 units of currency that the market participant with respect to bundle 100a must pay, as previously discussed, and displayed in field 613a. The transactions with respect to bundles 100b–100d can be interpreted in similar fashion (fields 613b–613d).

Although the embodiment of the present invention represented in transaction 600 is convenient in order to describe the intuitive interpretation hereinabove recited, such interpretation is unnecessary to the implementation of the present invention. A data processing system, such as data processing system 700 in FIG. 7, to be described, performs the method of the present invention by performing method steps such a those previously discussed, and in part made manifest in Equations (1)–(8). A specific embodiment of the present invention is instantiated through the choice of the preselected values appearing therein, and the process steps performed with respect thereto by the data processing system of the present invention. Calculational steps described in association with transaction 600 are for interpretive purposes only, in order to better understand the present invention. They do not necessarily represent literal process steps performed by the data processing system of the present invention, which will now be described.

Figure 7:
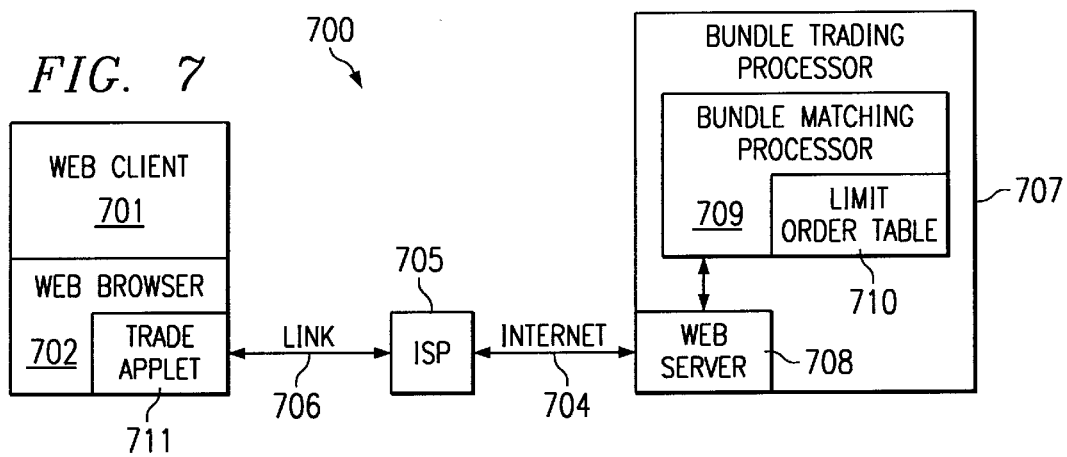
FIG. 7 schematically illustrates an embodiment of a data processing system according to the present invention.

A distributed data processing system may provide the environment for asset bundle trading according to the method of the present invention. Refer now to FIG. 7 in which is schematically illustrated such an embodiment of a distributed data processing system architecture, data processing system 700. Data processing system 700 utilizes the World Wide Web to effect communication between market participants and the bundle trading market.

The "World Wide Web" (WWW) is a hypertext information and communication system used on the Internet with data communications operating according to a client/server model using a Hypertext Transfer Protocol (HTTP). HTTP is a known application protocol that provides users access to files using a standard page description language referred to as Hypertext Markup Language (HTML). It should be noted that HTML is an application of Standard Generalized Markup Language (SGML), an international standard (ISO 8879) for text information processing. Furthermore, the files that are accessed using HTML may be provided in different formats, such as text, graphics, images, sound, and video, among others. WWW functionality within data processing clients typically has been through the introduction of "web browsers" that allows for simple graphical user interface-based access to network servers. Two commercially available web browsers are Netscape Communicator™ and Internet Explorer™. Although the present invention as embodied in data processing system 700 employs the WWW for communication, such an embodiment is not essential to its practice. Alternative embodiments may employ other communication methodologies.

In data processing system 700, a market participant communicates and interacts with the bundle trading market using its own data processing hardware, web client 701. Web browser 702 incorporated in web client 701 provides the web services to web client 701. Communications between the market participant and the bundled trading market are transported over the Internet 704, the worldwide computer network. Web client 701 accesses the Internet 704, through an internet service provider (ISP) 705 which web client 701 reaches via link 706. Link 706 may be a telephone line to which web client 701 attaches by means of a data modem. Alternatively, link 706 might be a digital link such as Integrated Services Digital Networks (ISDN). In yet another alternative, web client 701 might attach directly to the Internet thereby eliminating link 706 and ISP 705.

In data processing system 700, bundle trading processor 707 is directly connected to the Internet 704 by means of its web server 708. Communications between each market participant's web client, such as web client 701, and the market is handled by web server 708. Trade data is passed from web server 708 to bundle matching processor 709 in which trade execution takes place. Bundle matching processor 709 also passes trade data back to web server 708 for communication to web client 701 whence it becomes available to the market participant. Trade orders for execution are stored in a database, limit order table 710, within bundle matching processor 709. As trade orders are received, they are stored in limit order table 710. Bundle matching processor then updates limit order table 710 as trades are executed. It also notifies traders about the execution via the Internet as previously described. These processes will be described in detail subsequently. Both order submission and transaction data processing are performed using distributed data processing.

Distributed processing in distributed data processing system 700 may be implemented using Java technology. Java is a programming language that is designed as a distributed and dynamic language. A Java capable web browser can download and execute Java applications, called applets, just as if the applet were an executable resident on the browser's host data processor. Web client 701 in data processing system 700 contains trade applet 711 in web browser 702. The interactions of the market participant, using web client 701, with the bundle trading processor 707 are through trade applet 711. When a trader initially connects to bundle trading processor 707 over the Internet 704, trade applet 711 is downloaded to web client 701. Trade applet 711 receives and processes data sent by bundle trading processor 707, as well as sending orders thereto. In performing these tasks, both trade applet 711 and bundle trading processor 707 may invoke Java methods that are implemented both on the server side, that is, on web server 708, and the client side, that is, on web client 702 through trade applet 711, respectively.

Figure 8:
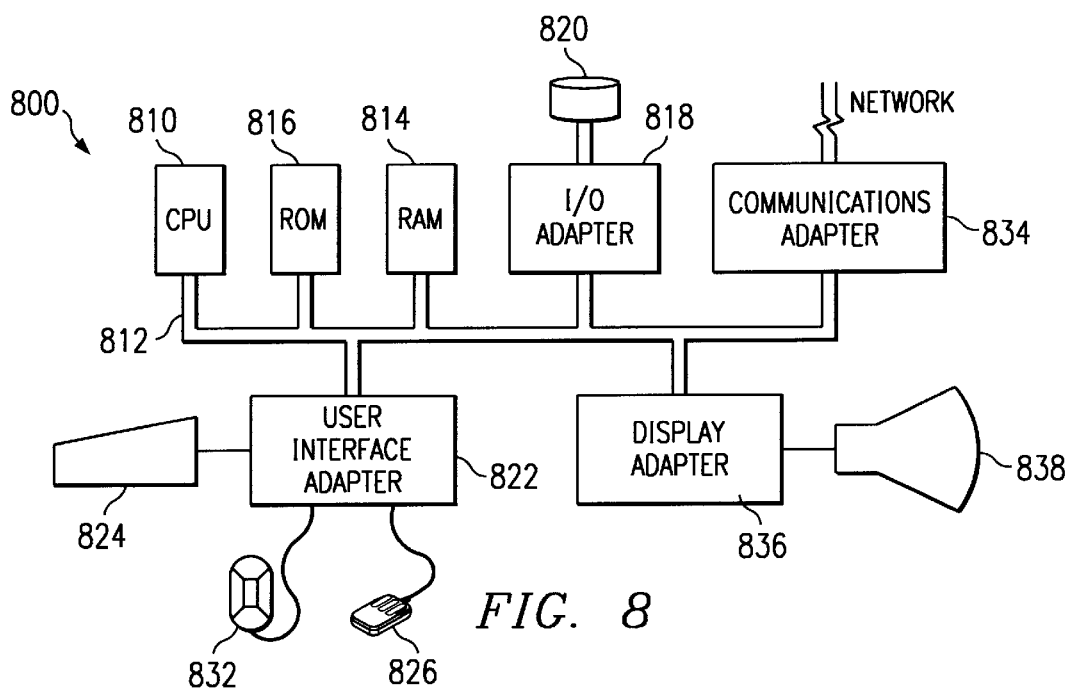
FIG. 8 illustrates, in block diagram form, a data processing system implemented in accordance with an embodiment of the present invention.

FIG. 8 illustrates a data processing system 800 that may be utilized to implement a web client 702 that executes the methodology of the present invention. Data processing system 800 comprises a central processing unit (CPU) 810, such as a microprocessor. CPU 810 is coupled to various other components via system bus 812. Read-only memory (ROM) 816 is coupled to the system bus 812 and includes a basic input/output system (BIOS) that controls certain basic functions of the data processing system 800. Random access memory (RAM) 814, I/O adapter 818, and communications adapter 834 are also coupled to system bus 812. I/O 818 may be a small computer system interface (SCSI) adapter that communicates with a disk storage device 820. Communications adapter 834 interconnects bus 812 with an outside network enabling the data processing system to communicate with other such systems. Communications adapter 834 may be a modem in an embodiment of the present invention in which link 706 is a telephone line connecting web client 702 to ISP 705 by means of a dial-up connection. Alternatively, if link 706 is an ISDN line, communications adapter 834 might be an ISDN terminal adapter. Input/output devices are also connected to system bus 812 via user interface adapter 822 and display adapter 836. Keyboard 824, trackball 832, and mouse 826 are all interconnected to bus 812 via user interface adapter 822. Display monitor 838 is coupled to system bus 812 by display adapter 836. In this manner, a user is capable of inputting to the system through keyboard 824, trackball 832, or mouse 826, and receiving output from the system via speaker 828 and display 838. Trade data transmitted to web client 701 by web server 708, and processed for outputting by trade applet 711, may be presented to the market participant on display 838.

Similarly data processing system 800 may be utilized to implement bundle trading processor 707. In such an embodiment, data processing system 800 may represent a high-end work station or minicomputer, and may include multiple processors, 810. In a data processing system 800 implementing a bundle trading market, communications adapter 834 may be a network transceiver.

Some embodiments of the invention may include implementations as a computer system program to execute the method or methods described herein, and as a computer program product. According to the computer system implementation, sets of instructions for executing the method or methods are resident in RAM 814 of one or more computer systems configured generally as described above. Until required by the computer system, the set of instructions may be stored as a computer program product in another computer memory, for example, in disk drive 820 (which may include a removable memory such as an optical disk or floppy disk for eventual use in disk drive 820).

Moreover, as has been previously described, the computer program product can also be stored at another computer and transmitted in a computer readable medium when desired to the market participant's web client 701 by an external network such as the Internet 704. One skilled in the art would appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Figure 9A:
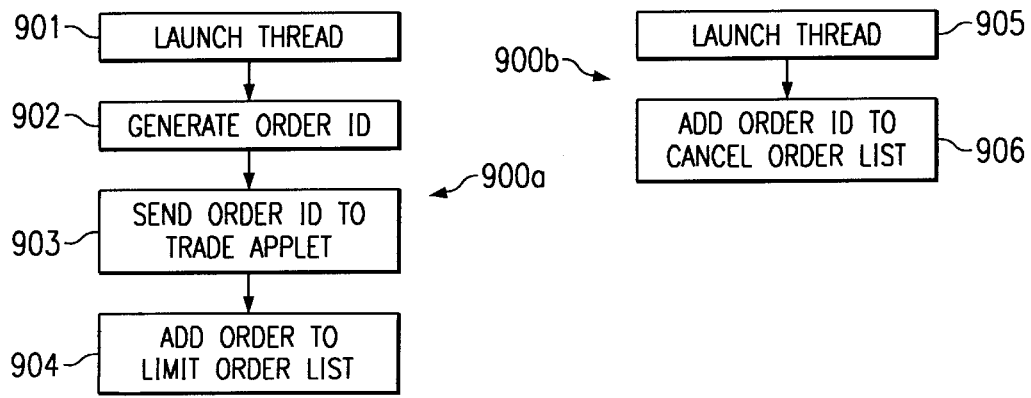

Refer now to FIG. 9 in which a flow chart illustrating an embodiment of a method of the present invention in a multithread computer environment is shown. Java is such a multithreading environment. Threads are computational units within a software program that carry out different tasks. Generally, threads are asynchronous. That is, one thread does not need to wait for another thread to complete execution before it can start running.

A bundled trade is entered when a market participant sends an order to bundle trading processor 707. This is effected by trade applet 711 invoking a send order method which causes the launching of thread 900a in step 901. Each time a market participant enters an order, another copy of thread 900a is launched. In step 902, an order identification is generated. The order identification is a unique identifier that identifies each order in the market. The order identification is sent back to trade applet 711 in step 903. A market participant may submit multiple orders and the order identification permits a trade applet, such as trade applet 711, to associate, with the appropriate order, data pertaining to transactions with respect to each order entered. In step 904, the order is added to the order database, limit order table 710. Because a second market participant may enter an order before the thread entering an order from a first market participant has completed executing, it is possible that two orders may be assigned the same order identification. In an embodiment of the present invention, this can be prevented by forcing the send order method of thread 900a to be synchronous. That is, the thread launched by the second market participant's order entry cannot begin execution until the thread launched when the first market participant entered its order completes execution.

A market participant may also delete an order prior to its execution. When the market participant elects to cancel his order, trade applet 711 invokes a cancel order method, launching thread 900b, in step 905. In step 906, the order identification of the order to be cancelled is added to a cancel order list.

A third thread 900c effects the execution of bundled trades. This thread launches in step 907 when a bundle trading "market", such as bundled trading processor 707, is initiated, and then continuously loops through the limit order database. First, in step 908, orders in the order database are checked to see if they are in the cancel order list. If so, they are deleted from the database in step 909, and the market participant is notified in step 910 through the invocation of methods implemented in the trade applet, such as trade applet 711, as previously discussed. Then, in step 911, trades are matched using the methods of the present invention previously described hereinabove. In step 912, the order identification of matched trades are compared with the current entries in the cancel order list. If a matched trade appears in the cancel order list, the order identification is deleted from the cancel order list, step 913, and the market participant is notified, again through the trade applet, that his cancellation came too late. In any case, quantities are updated for matched trades, step 915, and the market participants are notified, step 916. As previously described, the trade applet receives the updated data and processes it for outputting to the market participant, for example by means of a graphic display of an order table on display 838.

However, a market participant need not be associated with a human operator. An embodiment of the present invention may be utilized in a purely electronic marketplace in which trades are entered by an automated trading program. An illustrative example might be trading in shares of index funds. The fund's "trader", a software program, seeks to buy or sell, as a bundle, all of the assets forming the index. Bundles are bought and sold as subscribers either acquire or dispose of shares of the fund. Buy orders and sell orders may be entered electronically via the Internet, for example, and the transaction between the subscriber and the fund closed by using electronic funds transfer. The trade data received via the trade applet might then be stored in RAM 814 or mass storage device 820 for further processing in closing the transaction. From the perspective of the bundle trading market, the market participants in this market are program trading data processing systems.

In FIG. 10, a flowchart is illustrated depicting the data processing of trade matching, step 911, in further detail. In step 1000, a hash table is generated that maps order identifications to bundle indices used in the matching algorithm as described hereinabove with respect to FIG. 2. Step 1001 includes entering the order data contained in the order database into the matching optimization process previously described in conjunction with FIG. 3. The optimization process outputs matched trade bundles identified by a bundle index. The hash table generated in step 1001 is used to identify matched orders in the order database by order identification, step 1002. The transaction volumes and prices are then calculated using the method of the present invention previously described in association with FIG. 4, in step 1003. In step 1004, the order database is updated based on the transaction volumes. In other words, new $u_j$ are calculated to account for the part of each bundle "j" exchanged in the transaction. If an order is fully matched, the new value of $u_j$ for that bundle is zero, step 1005. It then is deleted from the database in step 1006. Otherwise, it remains in the database, and may participate in further transactions. After the database is updated, the process continues in step 1007 with step 912.

Figure 11:
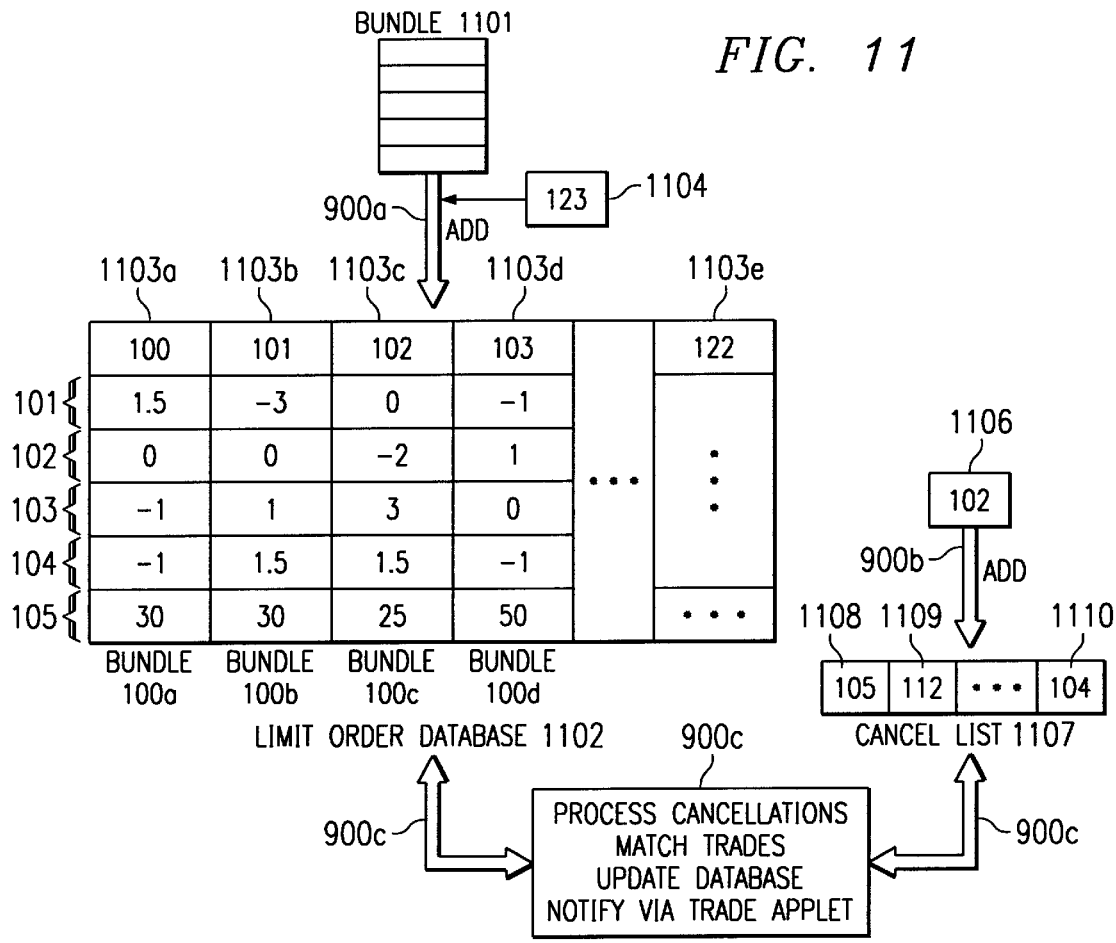
FIG. 11 schematically illustrates the interaction of distributed data processing threads according to an embodiment of the present invention.

The operation of a data processing system according to an embodiment of the present invention may be further appreciated by referring to FIG. 11. The operation of the asynchronous threads on the data structures within a data processing system according to the present invention, such as data processing system 700, is schematically illustrated therein.

A new trade bundle, bundle 1101, is to be added to limit order database 1102. Bundles within database 1102 are identified by order identifications, fields 1103a–1103e. The last order identification in database 1102 is "122" in field 1103e. A first thread, corresponding to thread 900a, generates the next order identification, "123" in field 1104. It then adds the new order, bundle 1101 to database 1102.

A market participant may cancel an order before it is executed. An order posted for cancellation, field 1106 containing the order's identification, here shown to be order "102", is added to cancel order list 1107, by a second asynchronous thread corresponding to thread 900b.

The third thread in FIG. 11, corresponding to thread 900c, is the trade matching thread. It monitors both database 1102 and cancel list 1107. Orders within database 1102, such as bundles 100a–100d shown, are continuously matched using the methods of the present invention heretofore described. If an order identification appears in cancel list 1107, for example, order "105,""112," or "104," in fields 1108–1110 respectively, it is deleted both from database 1102 and cancel list 1107 by thread 900c. Matched trades in database 1102 are updated by thread 900c to reflect the exchange of assets resulting from the transaction. Thread 900c also notifies market participants via a trade applet, such as trade applet 711. As previously discussed, notification is made with respect to both matched trades, cancelled orders, and if an order posted for cancellation had been executed before cancellation was attempted.

Figures 12, 13:
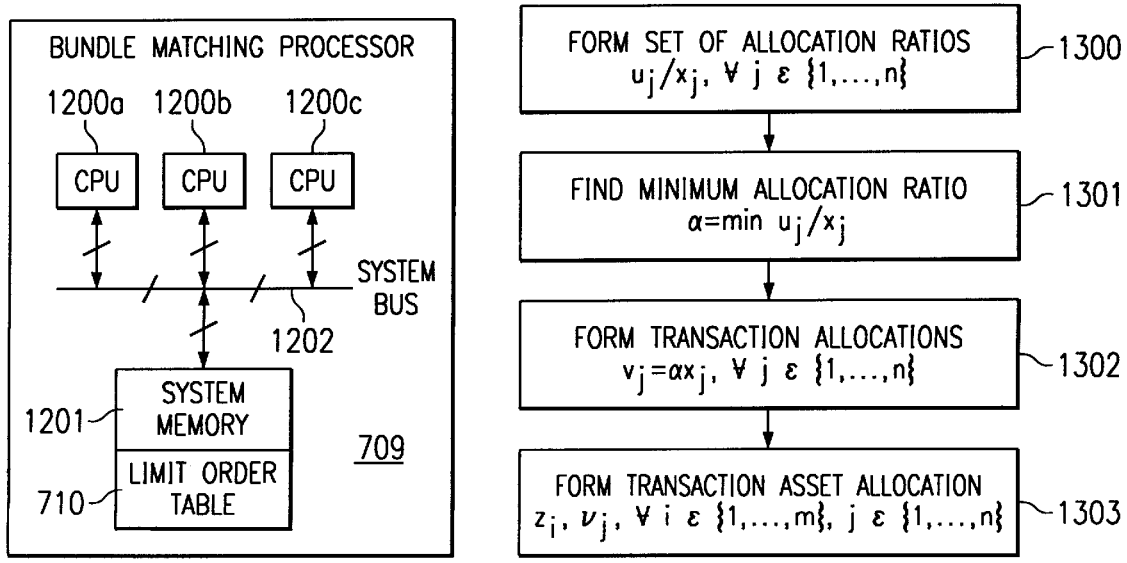
FIG. 12 illustrates, in block diagram form, a data processing system in accordance with an embodiment of the present invention.
FIG. 13 illustrates a flow diagram of a method of allocation distribution according to an embodiment of the present invention.

As previously noted, a data processing system for matching bundle trades in accordance with the present invention is adaptable for a multiprocessor environment. Refer now to FIG. 12 in which an embodiment of a bundle matching processor 709 having multiple processors is illustrated. Bundle matching processor 709 includes three central processing units CPUs 1200a–1200c. These are connected to a system memory 1201 via system bus 1202. Each of CPUs 1200a–1200c may be dedicated to executing, independently and asynchronously, a bundle trading thread in accordance with a method of the present invention. For example, CPU 1200a may execute thread 900a for entering bundle trades, as discussed hereinabove. Similarly, CPU 1200b may execute thread 900c for matching trades, and CPU 1200c may execute thread 900b for deleting bundle trades. System memory 1201 may include limit order table 710. Alternatively, one CPU, say CPU 1200a, may be dedicated to executing two threads, for example, thread 900a for entering bundle trades, and thread 900c for deleting bundle trades. In such an embodiment, one of the other two CPUs, for example, CPU 1200c, may execute thread 900b for matching bundle trades. The remaining CPU may incorporate web server 708, or alternatively web server 708 might be embodied in CPU 1200a. It would be understood by one of ordinary skill in the art that the alternative embodiments represented by the various presentations of the multiprocessor tasks are all embraced within the disclosed methods and apparatus of the present invention. In yet another alternative embodiment, CPUs 1200a–1200c may execute threads in synchronous fashion.

Although the present invention and its advantages have been described in detail, it should be understood that various changes, substitutions and alterations can be made herein without departing from the spirit and scope of the invention as defined by the appended claims.

What is claimed is:

1. In a data processing system, a method of asset trading comprising the steps of:
   entering a plurality of bundled trades;
   matching trades among said plurality of bundled trades, wherein each of said plurality of bundled trades includes a bundle size value and each of said plurality of bundled trades includes a set of proportions of each asset of plurality of assets to be traded in units of said bundle size value; and
   allocating a set of said plurality of assets in response to said step of matching trades, said step of matching trades comprising:
   selecting a set of numerical values, wherein said set of numerical values has a same number of members as a number of said plurality of entered bundled trades, said set of numerical values forming a set of allocation values; and
   multiplying each proportion of asset to be traded by one of each numerical value of said set of numerical values, said step of multiplying being performed for each bundled trade, thereby forming a set of weighted proportions of assets to be traded, said set of weighted proportions having a number of weighted proportions equal to a number of said assets to be traded, and wherein said step of matching trades further comprises a step of forming a set of transaction allocations, said step of forming a set of transaction allocations further comprising the steps of:
   for each bundled trade having a non-zero allocation value, dividing each bundle size by said non-zero allocation value, thereby forming a set of allocation ratios;
   finding a smallest allocation ratio of said set of allocation ratios; and
   multiplying each allocation value of said set of allocation values by said smallest allocation ratio, thereby forming a transaction allocation corresponding to each bundle trade of said plurality of bundle trades.

2. The method of claim 1 wherein said step of matching trades further comprises the step of multiplying each proportion of said set of proportions of each asset for each bundled trade by a corresponding allocation ratio for each bundled trade, thereby forming a transaction asset allocation for each asset in said each bundled trade, a set of transaction asset allocations being formed for said each bundled trade.

3. The method of claim 2 further comprising the step of negating each of said weighted proportions of said set of weighted proportions thereby forming a set of market surpluses, each market surplus of said set of market surpluses being a market surplus corresponding to each of said assets to be traded.

4. The method of claim 3 further comprising the step of redistributing each market surplus of said set of market surpluses.

5. The method of claim 4 wherein the step of redistributing each market surplus of said set of market surpluses further comprises the steps of:
   selecting a first set of redistribution values, said first set of redistribution values including a plurality of redistribution values, wherein each value corresponds with an asset to be traded, a number of said values being equal to a number of assets to be traded;
   selecting a plurality of second sets of redistribution values, said plurality of second sets having a number of sets equal to a number of entered bundled trades, and wherein each value in each second set corresponds with an asset to be traded, a number of said values being equal to a number of assets to be traded, and wherein a sum of all redistribution values, from said first set and from said plurality of second sets, corresponding with each asset has a value of one;
   multiplying each redistribution value in said first set by each market surplus of its corresponding asset, thereby forming a first set of surplus redistribution values;
   multiplying each redistribution value in each second set by each market surplus of its corresponding asset, thereby forming a plurality of second sets of surplus redistribution values, each said redistribution value corresponding to an asset to be traded, and each set of said plurality of second sets of surplus redistribution values corresponding with an asset bundle; multiplying each surplus redistribution value in said first set of surplus redistribution values by said smallest allocation ratio, thereby forming a set of first transaction redistributions, said first transaction redistributions being retained by a market maker;

multiplying each surplus redistribution value in each set of said plurality of second sets of redistribution values by said smallest allocation ratio, thereby forming a plurality of sets of second transaction redistributions, each of said plurality of sets of second transaction redistributions corresponding with an entered bundled trade; and adding each second surplus redistribution value to its corresponding transaction allocation in its corresponding asset bundle.

6. The method of claim 5 wherein each proportion of said set of proportions of each asset to be traded includes an algebraic sign, a first algebraic sign signifying an acquisition offer and a second algebraic sign signifying a disposition offer, said second algebraic sign being opposite said first algebraic sign.

7. The method of claim 6 wherein the step matching trades includes determining that each weighted proportion of said set of weighted proportions has a value having an algebraic sign not equal to said first algebraic sign.

8. The method of claim 5 wherein said step of matching trades includes an optimization step.

9. The method of claim 8 wherein said optimization step further comprises the step of solving a linear programming problem, wherein an objective function, $$\sum_{i=1}^{m} c_i \mu_i,$$

is extremized subject to a set of constraints, wherein m is a number of assets to be traded, $\mu_i$ is said market surplus, corresponding to asset number "i", said market surplus being $$-\sum_{j=1}^{n} z_{ij} x_j \ \forall \ i \in \{1, \ldots, m\},$$

wherein said $z_{ij}$ are said set of proportions of each asset to be traded, a number "j" corresponding to a bundle trade number of said plurality of bundled trades, said $z_{ij}$ corresponding to acquisition offers having a first algebraic sign, $\sigma_1$, and disposition offers having a second algebraic sign, $\sigma_2$, opposite said first algebraic sign, $\sigma_2 = -\sigma_1$, said set of constraints comprising:

$$\text{sgn}\{\mu_i\} \neq \sigma_2, \ \forall i \in \{1, \ldots, m\}, \text{ and}$$

$$0 \leq x_j \leq u_j, \ \forall j \in \{1, \ldots, n\}$$

wherein said sgn function extracts an algebraic sign of its argument and returns zero if its argument is zero, and n is a number of entered bundled trades in a data processing system using said method of asset trading, and wherein said $x_j$ are given by a solution of said linear programming problem, each said $x_j$ being an allocation value corresponding to bundle trade number "j", said $u_j$ being a bundle size corresponding to bundle trade number "j", and wherein said $c_i$ are preselected constants.

10. The method of claim 8 wherein said optimization step further comprises the step of solving a linear programming problem, wherein an objective function, $$\sum_{i=1}^{m} c_i \mu_i,$$

is extremized subject to a set of constraints, wherein m is a number of assets to be traded, $\mu_i$ is said market surplus, corresponding to asset number "i", said market surplus being $$-\sum_{j=1}^{n} z_{ij} x_j \ \forall \ i \in \{1, \ldots, m\},$$

wherein said $z_{ij}$ are said set of proportions of each asset to be traded, a number "j" corresponding to a bundle trade number of said plurality of bundled trades, said $z_{ij}$ corresponding to acquisition offers having a first algebraic sign, $\sigma_1$, and disposition offers having a second algebraic sign, $\sigma_2$, opposite said first algebraic sign, $\sigma_2 = -\sigma_1$, said set of constraints comprising:

$$\text{sgn}\{\mu_i\} \neq \sigma_2, \ \forall i \in \{1, \ldots, m\},$$

$$\sum_{j=1}^{n} x_j \leq 1, \text{ and}$$

$$x_j \geq 0, \ \forall j \in \{1, \ldots, n\},$$

wherein said sgn function extracts an algebraic sign of its argument and returns zero if its argument is zero, and n is a number of entered bundled trades in a data processing system using said method of asset trading, and wherein said $x_j$ are given by a solution of said linear programming problem, each said $x_j$ being an allocation value corresponding to bundle trade number "j", said $u_j$ being a bundle size corresponding to bundle trade number "j", and wherein said $c_i$ are preselected constants.

11. The method of claim 9 wherein said extremization of said objective function is a maximization, and $\sigma_1$ is positive.

12. The method of claim 9 wherein said extremization of said objective function is a minimization, and $\sigma_1$ is negative.

13. The method of claim 10 wherein said extremization of said objective function is a maximization, and $\sigma_1$ is positive.

14. The method of claim 10 wherein said extremization of said objective function is minimization, and $\sigma_1$ is negative.

15. The method of claim 9 further comprising the step of determining an imputed price of each asset in said asset bundle using a corresponding dual value.

16. The method of claim 10 further comprising the step of determining an imputed price of each asset in said asset bundle using a corresponding dual value.

17. A data processing system for trading asset bundles comprising:

circuitry for entering a plurality of bundled trades;

circuitry for matching bundled trades among said plurality of bundled trades wherein each bundled trade includes a bundle size value, and each bundled trade includes a set of proportions of each asset of said plurality of assets to be traded in units of said bundle size value; and circuitry for allocating a set of assets of said plurality of assets to be traded in response to said circuitry for matching bundled trades, and wherein said circuitry for matching trades further comprises:

circuitry for selecting a set of numerical values, wherein said set of numerical values has a same number of members as a number of said plurality of entered bundled trades, said set of numerical values forming a set of allocation values; and circuitry for multiplying each proportion of asset to be traded by one of each numerical value of said set of numerical values, said step of multiplying being performed for each bundled trade, thereby forming a set of weighted proportions of assets to be traded, said set of weighted proportions having a number of weighted proportions equal to a number of said assets to be traded; and circuitry for forming a set of transaction allocations, said circuitry for forming a set of transaction allocations further comprising:

circuitry, for each bundled trade having a non-zero allocation value, for dividing each bundle size by said non-zero allocation value, thereby forming a set of allocation ratios;

circuitry for finding a smallest allocation ratio of said set of allocation ratios; and circuitry for multiplying each allocation value of said set of allocation values by said smallest allocation ratio, thereby forming a transaction allocation corresponding to each bundled trade of said plurality of bundled trades.

18. The data processing system of claim 17 wherein said circuitry for forming a set of allocation values further comprises circuitry for multiplying each proportion of said set of proportions of each asset for each bundled trade by a corresponding allocation ratio for each bundled trade, thereby forming a transaction asset allocation for each asset in said each bundled trade, a set of transaction asset allocations being formed for said each bundled trade.

19. The data processing system of claim 18 further comprising circuitry for negating each of said weighted proportions thereby forming a set of market surpluses, each of said set of market surpluses being a market surplus corresponding to each of said assets to be traded.

20. The data processing system of claim 19 further comprising circuitry for redistributing each market surplus of said set of market surpluses.

21. The data processing system of claim 20 wherein said circuitry for redistributing each market surplus of said set of market surpluses further comprises:

circuitry for selecting a first set of redistribution values, said first set of redistribution values including a plurality of redistribution values, wherein each value corresponds with an asset to be traded, a number of said values being equal to a number of assets to be traded;

circuitry for selecting a plurality of second sets of redistribution values, said plurality of second sets having a number of sets equal to a number of entered bundled trades, and wherein each value in each second set corresponds with an asset to be traded, a number of said values being equal to a number of assets to be traded, and wherein a sum of all redistribution values, from said first set and from said plurality of second sets, corresponding with each asset has a value of one;

circuitry for multiplying each redistribution value in said first set by each market surplus of its corresponding asset, thereby forming a first set of surplus redistribution values;

circuitry for multiplying each redistribution value in each second set by each market surplus of its corresponding asset, thereby forming a plurality of second sets of surplus redistribution values, each said redistribution value corresponding to an asset to be traded, and each set of said plurality of second sets of surplus redistribution values corresponding with an asset bundle;

circuitry for multiplying each surplus redistribution value in said first set of surplus redistribution values by said smallest allocation ratio, thereby forming a set of first transaction redistributions, said first transaction redistributions being retained by a market maker;

circuitry for multiplying each surplus redistribution value in each set of said plurality of second sets of redistribution values by said smallest allocation ratio, thereby forming a plurality of sets of second transaction redistributions, each of said plurality of sets of second transaction redistributions corresponding with an entered bundled trade; and circuitry for adding each second surplus redistribution value to its corresponding transaction allocation in its corresponding asset bundle.

22. The data processing system of claim 17 wherein said circuitry for matching bundled trades includes circuitry for optimizing the trade matching.

23. The data processing system of claim 22 wherein said circuitry for optimization further comprises circuitry for solving a linear programming problem, wherein an objective function, $$\sum_{i=1}^{m} c_i \mu_i,$$

is extremized subject to a set of constraints, wherein m is a number of assets to be traded, $\mu_i$ is said market surplus, corresponding to asset number "i", said market surplus being $$-\sum_{j=1}^{n} z_{ij} x_j \ \forall \ i \in \{1, \ldots, m\},$$

wherein said $z_{ij}$ are said set of proportions of each asset to be traded, a number "j" corresponding to a bundle trade number of said plurality of bundled trades, said $z_{ij}$ corresponding to acquisition offers having a first algebraic sign, $\sigma_1$, and disposition offers having a second algebraic sign, $\sigma_2$, opposite said first algebraic sign, $\sigma_2 = -\sigma_1$, said set of constraints comprising:

$$\text{sgn}\{\mu_i\} \neq \sigma_2, \ \forall i \in \{1, \ldots m\}, \text{ and}$$

$$0 \leq x_j \leq u_j, \ \forall j \in \{1, \ldots, n\}$$

wherein said sgn function extracts an algebraic sign of its argument and returns zero if its argument is zero, and n is a number of entered bundled trades in a data processing system using said method of asset trading, and wherein said $x_j$ are given by a solution of said linear programming problem, each said $x_j$ being an allocation value corresponding to bundle trade number "j", said $u_j$ being a bundle size corresponding to bundle trade number "j", and wherein said $c_i$ are preselected constants.

24. The data processing system of claim 22 wherein said circuitry for optimization further comprises circuitry for solving a linear programming problem, wherein an objective function, $$\sum_{i=1}^{m} c_i \mu_i,$$

is extremized subject to a set of constraints, wherein m is a number of assets to be traded, $\mu_i$ is said market surplus, corresponding to asset number "i", said market surplus being $$-\sum_{j=1}^{n} z_{ij} x_j \forall\, i \in \{1, \ldots, m\},$$

wherein said $z_{ij}$ are said set of proportions of each asset to be traded, a number "j" corresponding to a bundle trade number of said plurality of bundled trades, said $z_{ij}$ corresponding to acquisition offers having a first algebraic sign, $\sigma_1$, and disposition offers having a second algebraic sign, $\sigma_2$, opposite said first algebraic sign, $\sigma_2 = -\sigma_1$, said set of constraints comprising:

$$\text{sgn}\{\mu_i\} \neq \sigma_2, \quad \forall\, i \in \{1, \ldots, m\},$$

$$\sum_{j=1}^{n} x_j \leq 1, \text{ and}$$

$$x_j \geq 0, \quad \forall\, j \in \{1, \ldots, n\},$$

wherein said sgn function extracts the algebraic sign of its argument and returns zero if its argument is zero, and n is a number of entered bundled trades in a data processing system using said method of asset trading, and wherein said $x_j$ are given by a solution of said linear programming problem, each said $x_j$ being an allocation value corresponding to bundle trade number "j", said $u_j$ being a bundle size corresponding to bundle trade number "j", and wherein said $c_i$ are preselected constants.

25. The data processing system of claim 23 wherein said extremization of said objective function is a maximization, and $\sigma_1$ is positive.

26. The data processing system of claim 23 wherein said extremization of said objective function is minimization, and $\sigma_1$ is negative.

27. The data processing system of claim 24 wherein said extremization of said objective function is maximization, and $\sigma_1$ is positive.

28. The data processing system of claim 24 wherein said extremization of said objective function is minimization, and $\sigma_1$ is negative.

29. The data processing system of claim 23 further comprising circuitry for determining an imputed price of each asset in said asset bundle using a corresponding dual value.

30. The data processing system of claim 24 further comprising circuitry for determining an imputed price of each asset in said asset bundle using a corresponding dual value.

31. A program product embodied in a computer readable medium, the program product for bundle trading of assets comprising instructions for:
entering a plurality of bundled trades;
matching bundled trades among said plurality of bundled trades, wherein each bundled trade includes a set of proportions of each asset of a plurality of assets to be traded; and
allocating a set of said plurality of assets in response to said programming for matching bundled trades, wherein said programming for matching bundled trades further comprises:
selecting a set of numerical values, wherein said set of numerical values has a same number of members as a number of said plurality of entered bundled trades, said set of numerical values forming a set of allocation values; and
multiplying each proportion of asset to be traded by one of each numerical value of said set of numerical values, said step of multiplying being performed for each bundled trade, thereby forming a set of weighted proportions of assets to be traded, said set of weighted proportions having a number of weighted proportions equal to a number of said assets to be traded; and
forming a set of transaction allocations, said programming for forming a set of transaction allocations further comprising:
each bundled trade having a non-zero allocation value, for dividing each bundled size by said non-zero allocation value, thereby forming a set of allocation ratios;
finding a smallest allocation ratio of said set of allocation ratios; and
multiplying each allocation value of said set of allocation values by said smallest allocation ratio, thereby forming a transaction allocation corresponding to each bundled trade of said plurality of bundled trades.

32. The program product embodied in a computer readable medium of claim 31 wherein said instructions for forming a set of allocation values further comprises instructions for multiplying each proportion of said set of proportions of each asset for each bundled trade by a corresponding allocation ratio for each bundled trade, thereby forming a transaction asset allocation for each asset in said each bundled trade, a set of transaction asset allocations being formed for said each bundled trade.

33. The program product embodied in a computer readable medium of claim 32 further comprising instructions for negating each of said weighted proportions thereby forming a set of market surpluses, each of said set of market surpluses being a market surplus corresponding to each of said assets to be traded.

34. The program product embodied in a computer readable medium of claim 33 further comprising instructions for redistributing circuitry for redistributing each market surplus of said set of market surpluses.

35. The program product embodied in a computer readable medium of claim 34 wherein said instructions for redistributing each market surplus of said set of market surpluses further comprise instructions for:
selecting a first set of redistribution values, said first set of redistribution values including a plurality of redistribution values, wherein each value corresponds with an asset to be traded, a number of said values being equal to a number of assets to be traded;
selecting a plurality of second sets of redistribution values, said plurality of second sets having a number of sets equal to a number of entered bundled trades, and wherein each value in each second set corresponds with an asset to be traded, a number of said values being equal to a number of assets to be traded, and wherein a sum of all redistribution values, from said first set and from said plurality of second sets, corresponding with each asset has a value of one;
multiplying each redistribution value in said first set by each market surplus of its corresponding asset, thereby forming a first set of surplus redistribution values;

multiplying each redistribution value in each second set by each market surplus of its corresponding asset, thereby forming a plurality of second sets of surplus redistribution values each said redistribution value corresponding to an asset to be traded, and each set of said plurality of second sets of surplus redistribution values, corresponding with an asset bundled;

multiplying each surplus redistribution value in said first set of surplus redistribution values by said smallest allocation ratio, thereby forming a set of first transaction redistributions, said first transaction redistributions being retained by a market maker;

multiplying each surplus redistribution value in each set of said plurality of second sets of redistribution values by said smallest allocation ratio, thereby forming a plurality of sets of second transaction redistributions, each of said plurality of sets of second transaction redistributions corresponding with an entered bundled trade; and adding each second surplus redistribution value to its corresponding transaction allocation in its corresponding asset bundled.

36. The program product embodied in a computer readable medium of claim 31 wherein said instructions for matching bundled trades includes instructions for optimizing the bundled trade matching.

37. The program product embodied in a computer readable medium of claim 36 wherein said instructions for optimization further comprises programming for solving a linear programming problem, wherein an objective function, $$\sum_{i=1}^{m} c_i \mu_i,$$

is extremized subject to a set of constraints, wherein m is a number of assets to be traded, $\mu_i$ is said market surplus, corresponding to asset number "i", said market surplus being $$-\sum_{j=1}^{n} z_{ij} x_j \forall i \in \{1, \ldots, m\},$$

wherein said $z_{ij}$ are said set of proportions of each asset to be traded, a number "j" corresponding to a bundled trade number of said plurality of bundled trades, said $z_{ij}$ corresponding to acquisition offers having a first algebraic sign, $\sigma_1$, and disposition offers having a second algebraic sign, $\sigma_2$, opposite said first algebraic sign, $\sigma_2 = -\sigma_1$, said set of constraints comprising:

$$\text{sgn}\{\mu_i\} \neq \sigma_2, \quad \forall i \in \{1, \ldots m\}, \text{ and}$$

$$0 \leq x_j \leq u_j, \quad \forall j \in \{1, \ldots, n\}$$

wherein said sgn function extracts an algebraic sign of its argument and returns zero if its argument is zero, and n is a number of entered bundled trades in a data processing system using said method of asset trading, and wherein said $x_j$ are given by a solution of said linear programming problem, each said $x_j$ being an allocation value corresponding to bundled trade number "j", said $u_j$ being a bundled size corresponding to bundled trade number "j", and wherein said $c_i$ are preselected constants.

38. The program product embodied in a computer readable medium of claim 36 wherein said instructions for optimization further comprises programming for solving a linear programming problem, wherein an objective function, $$\sum_{i=1}^{m} c_i \mu_i,$$

is extremized subject to a set of constraints, wherein m is a number of assets to be traded, $\mu_i$ is said market surplus, corresponding to asset number "i", said market surplus being $$-\sum_{j=1}^{n} z_{ij} x_j \forall i \in \{1, \ldots, m\},$$

wherein said $z_{ij}$ are said set of proportions of each asset to be traded, a number "j" corresponding to a bundled trade number of said plurality of bundled trades, said $z_{ij}$ corresponding to acquisition offers having a first algebraic sign, $\sigma_1$, and disposition offers having a second algebraic sign, $\sigma_2$, opposite said first algebraic sign, $\sigma_2 = -\sigma_1$, said set of constraints comprising:

$$\text{sgn}\{\mu_i\} \neq \sigma_2, \quad \forall i \in \{1, \ldots, m\},$$

$$\sum_{j=1}^{n} x_j \leq 1, \quad \text{and}$$

$$x_j \geq 0, \quad \forall j \in \{1, \ldots, n\},$$

wherein said sgn function extracts an algebraic sign of its argument and returns zero if its argument is zero, and n is a number of entered bundled trades in a data processing system using said method of asset trading, and wherein said $x_j$ are given by a solution of said linear programming problem, each said $x_j$ being an allocation value corresponding to bundled trade number "j", said $u_j$ being a bundled size corresponding to bundled trade number "j", and wherein said $c_i$ are preselected constants.

39. The program product embodied in a computer readable medium of claim 37 wherein said extremization of said objective function is a maximization, and $\sigma_1$ is positive.

40. The program product embodied in a computer readable medium of claim 37 wherein said extremization of said objective function is minimization, and $\sigma_1$ is negative.

41. The program product embodied in a computer readable medium of claim 38 wherein said extremization of said objective function is maximization, and $\sigma_1$ is positive.

42. The program product embodied in a computer readable medium of claim 38 wherein said extremization of said objective function is minimization, and $\sigma_1$ is negative.

43. The program product embodied in a computer readable medium of claim 37 further comprising instructions for determining an imputed price of each asset in said asset bundle using a corresponding dual value.

44. The program product embodied in a computer readable medium of claim 38 further comprising instructions for determining an imputed price of each asset in said asset bundle using a corresponding dual value.

45. A method of asset trading comprising the steps of:
entering a plurality of bundled trades;
matching trades among a set of said plurality of bundled trades, wherein each bundled trade includes a set of proportions of each asset of a plurality of assets to be traded; and
allocating a set of assets of said plurality of assets in response to said step of matching trades, wherein said step of matching trades further comprises the steps of:

selecting a set of numerical values, wherein said set of numerical values has a same number of members as a number of said plurality of entered bundled trades, said set of numerical values forming a set of allocation values; and multiplying each proportion of asset to be traded by one of each numerical value of said set of numerical values, said step of multiplying being performed for each bundled trade, thereby forming a set of weighted proportions of assets to be traded, said set of weighted proportions having a number of weighted proportions equal to a number of said assets to be traded, and wherein said step of matching trades further comprises a step of forming a set of transaction allocations, said step of forming a set of transaction allocations further comprising the steps of:

for each bundled trade having a non-zero allocation value, dividing each bundled size by said non-zero allocation value, thereby forming a set of allocation ratios;

finding a smallest allocation ratio of said set of allocation ratios; and multiplying each allocation value of said set of allocation values by said smallest allocation ratio, thereby forming a transaction allocation corresponding to each bundled trade of said plurality of bundled trades.

46. The method of claim 45 wherein said step of matching trades further comprises the step of multiplying each proportion of said set of proportions of each asset for each bundled trade by a corresponding allocation ratio for each bundled trade, thereby forming a transaction asset allocation for each asset in said each bundled trade, a set of transaction asset allocations being formed for said each bundled trade.

47. The method of claim 46 further comprising the step of negating each of said weighted proportions of said set of weighted proportions thereby forming a set of market surpluses, each market surplus of said set of market surpluses being a market surplus corresponding to each of said assets to be traded.

48. The method of claim 47 further comprising the step of redistributing each market surplus of said set of market surpluses.

49. The method of claim 48 wherein the step of redistributing each market surplus of said set of market surpluses further comprises the steps of:

selecting a first set of redistribution values, said first set of redistribution values including a plurality of redistribution values, wherein each value corresponds with an asset to be traded, a number of said values being equal to a number of assets to be traded;

selecting a plurality of second sets of redistribution values, said plurality of second sets having a number of sets equal to a number of entered bundled trades, and wherein each value in each second set corresponds with an asset to be traded, a number of said values being equal to a number of assets to be traded, and wherein a sum of all redistribution values, from said first set and from said plurality of second sets, corresponding with each asset has a value of one;

multiplying each redistribution value in said first set by each market surplus of its corresponding asset, thereby forming a first set of surplus redistribution values;

multiplying each redistribution value in each second set by each market surplus of its corresponding asset, thereby forming a plurality of second sets of surplus redistribution values, each said redistribution value corresponding to an asset to be traded, and each set of said plurality of second sets of surplus redistribution values corresponding with an asset bundle;

multiplying each surplus redistribution value in said first set of surplus redistribution values by said smallest allocation ratio, thereby forming a set of first transaction redistributions, said first transaction redistributions being retained by a market maker;

multiplying each surplus redistribution value in each set of said plurality of second sets of redistribution values by said smallest allocation ratio, thereby forming a plurality of sets of second transaction redistributions, each of said plurality of sets of second transaction redistributions corresponding with an entered bundled trade; and adding each second surplus redistribution value to its corresponding transaction allocation in its corresponding asset bundle.

50. The method of claim 49 wherein said step of matching trades includes an optimization step.

51. The method of claim 50 wherein said optimization step further comprises the step of solving a linear programming problem, wherein an objective function, $$\sum_{i=1}^{m} c_i \mu_i,$$

is extremized subject to a set of constraints, wherein m is a number of assets to be traded, $\mu_i$ is said market surplus, corresponding to asset number "i", said market surplus being $$-\sum_{j=1}^{n} z_{ij} x_j \ \forall \ i \in \{1, \ldots, m\},$$

said $z_{ij}$ corresponding to acquisition offers having a first algebraic sign, $\sigma_1$, and disposition offers having a second algebraic sign, $\sigma_2$, opposite said first algebraic sign, $\sigma_2 = -\sigma_1$, said set of constraints comprising:

$$\text{sgn}\{\mu_i\} \neq \sigma_2, \ \forall i \in \{1, \ldots m\}, \text{ and}$$

$$0 \leq x_j \leq u_j, \ \forall j \in \{1, \ldots, n\}$$

wherein said sgn function extracts an algebraic sign of its argument and returns zero if its argument is zero, and n is a number of entered bundled trades in a data processing system using said method of asset trading, and wherein said $x_j$ are given by a solution of said linear programming problem, each said $x_j$ being an allocation value corresponding to bundle trade number "j", said $u_j$ being a bundle size corresponding to bundle trade number "j", and wherein said $x_j$ are given by a solution of said linear programming problem, each said $x_j$ being an allocation value corresponding to bundle trade number "j", said $u_j$ being a bundle size corresponding to bundle trade number "j", and wherein said $c_i$ are preselected constants.

52. The method of claim 50 wherein said optimization step further comprises the step of solving a linear programming problem, wherein an objective function, $$\sum_{i=1}^{m} c_i \mu_i,$$

is extremized subject to a set of constraints, wherein m is a number of assets to be traded, $\mu_i$ is said market surplus, corresponding to asset number "i", said market surplus being $$-\sum_{j=1}^{n} z_{ij} x_j \ \forall \ i \in \{1, \ldots, m\},$$

said $z_{ij}$ corresponding to acquisition offers having a first algebraic sign, $\sigma_1$, and disposition offers having a second algebraic sign, $\sigma_2$, opposite said first algebraic sign, $\sigma_2 = -\sigma_1$, said set of constraints comprising:

$$\text{sgn}\{\mu_i\} \neq \sigma_2, \ \forall \ i \in \{1, \ldots, m\},$$

$$\sum_{j=1}^{n} x_j \leq 1, \quad \text{and}$$

$$x_j \geq 0, \ \forall \ j \in \{1, \ldots, n\},$$

wherein said sgn function extracts an algebraic sign of its argument and returns zero if its argument is zero, and n is a number of entered bundled trades in a data processing system using said method of asset trading, and wherein said $x_j$ are given by a solution of said linear programming problem, each said $x_j$ being an allocation value corresponding to bundle trade number "j", said $u_j$ being a bundle size corresponding to bundle trade number "j", each said $x_j$ being an allocation value corresponding to bundle trade number "j", said $\mu_j$ being a bundle size corresponding to bundle trade number "j", and wherein said $c_i$ are preselected constants.

* * * * *